US012586359B2

(12) United States Patent
Goldstein et al.

(10) Patent No.: US 12,586,359 B2
(45) Date of Patent: Mar. 24, 2026

(54) SYNTHETIC-TO-REALISTIC IMAGE CONVERSION USING GENERATIVE ADVERSARIAL NETWORK (GAN) OR OTHER MACHINE LEARNING MODEL

(71) Applicant: Raytheon Company, Waltham, MA (US)

(72) Inventors: Jonathan H. Goldstein, Fredericksburg, VA (US); Lauren E. Turney, Forney, TX (US); Richard W. Ely, Lewisville, TX (US); Jody D. Verret, Rockwall, TX (US); Brett N. Appleton, Centreville, VA (US)

(73) Assignee: Raytheon Company, Arlington, VA (US)

( * ) Notice: Subject to any disclaimer, the term of this patent is extended or adjusted under 35 U.S.C. 154(b) by 346 days.

(21) Appl. No.: 18/340,423

(22) Filed: Jun. 23, 2023

(65) Prior Publication Data

US 2024/0428568 A1 Dec. 26, 2024

(51) Int. Cl.
*G06V 10/774* (2022.01)
*G06N 3/094* (2023.01)
*G06V 10/82* (2022.01)

(52) U.S. Cl.
CPC ........... *G06V 10/774* (2022.01); *G06N 3/094* (2023.01); *G06V 10/82* (2022.01)

(58) Field of Classification Search
CPC ........ G06N 3/045; G06N 3/047; G06N 3/088; G06N 3/094; G06V 10/774; G06V 10/82
See application file for complete search history.

(56) References Cited

U.S. PATENT DOCUMENTS

| | | | |
|---|---|---|---|
| 9,269,145 | B2 | 2/2016 | Ely et al. |
| 9,275,267 | B2 | 3/2016 | Verret |
| 9,451,166 | B1 | 9/2016 | Ribardo, Jr. et al. |
| 9,767,572 | B2 | 9/2017 | Ely |
| 11,042,998 | B2 | 6/2021 | Ely |

(Continued)

FOREIGN PATENT DOCUMENTS

EP           4134860 A1 *  2/2023  ............. G06T 17/00

OTHER PUBLICATIONS

Weiquan Liu et al. ,"AE-GAN-Net: Learning Invariant Feature Descriptor to Match Ground Camera Images and a Large-Scale 3D Image-Based Point Cloud for Outdoor Augmented Reality," Sep. 26, 2019, Remote Sensing 2019, 11,2243, pp. 1-19.*

(Continued)

*Primary Examiner* — Omar S Ismail

(57) ABSTRACT

A method includes obtaining training data having first image pairs, where each of the first image pairs includes (i) a first training image and (ii) a first ground truth image. The method also includes training a machine learning model to generate realistic images using the first image pairs. The method further includes obtaining additional training data having second image pairs, where each of the second image pairs includes (i) a second training image and (ii) a second ground truth image. At least some of the images in the second image pairs are less aligned or of lower quality than at least some of the images in the first image pairs. In addition, the method includes continuing to train the machine learning model to generate the realistic images using the second image pairs.

20 Claims, 10 Drawing Sheets

(56) References Cited

U.S. PATENT DOCUMENTS

| | | | | |
|---|---|---|---|---|
| 11,127,145 | B2 | 9/2021 | Ely | |
| 11,138,696 | B2 | 10/2021 | Verret | |
| 11,538,135 | B2 | 12/2022 | Ely et al. | |
| 11,568,638 | B2 | 1/2023 | Sharp, III et al. | |
| 11,631,208 | B1 * | 4/2023 | Khirman | G06N 3/088 |
| | | | | 382/100 |
| 11,847,245 | B2 * | 12/2023 | Truong | G06N 3/094 |
| 2019/0035118 | A1 * | 1/2019 | Zhao | G06T 3/4076 |
| 2020/0026416 | A1 * | 1/2020 | Bala | G06N 3/0475 |
| 2021/0118099 | A1 * | 4/2021 | Kearney | A61B 6/5217 |
| 2022/0076067 | A1 * | 3/2022 | Marie-Nelly | G06T 7/10 |
| 2022/0088410 | A1 * | 3/2022 | Hibbard | G06N 3/0475 |
| 2022/0189145 | A1 * | 6/2022 | Evans | G06V 10/774 |
| 2022/0406049 | A1 * | 12/2022 | El-Baz | G16H 30/20 |
| 2023/0076868 | A1 * | 3/2023 | Olender | G06T 7/0012 |
| 2023/0133026 | A1 * | 5/2023 | Wang | G06V 10/774 |
| | | | | 345/419 |
| 2024/0257352 | A1 * | 8/2024 | Hu | G06N 3/0475 |

OTHER PUBLICATIONS

Ting-Chun Wang et al., "High-Resolution Image Synthesis and Semantic Manipulation with Conditional GANs," Jun. 2018, Proceedings of the IEEE Conference on Computer Vision and Pattern Recognition (CVPR), 2018, pp. 8798-8804.*

R. Barth et al., "Optimising realism of synthetic images using cycle generative adversarial networks for improved part segmentation," Apr. 23, 2020, Computers and Electronics in Agriculture 173 (2020), pp. 1-9.*

Jon Gauthier, "Conditional generative adversarial nets for convolutional face generation," May 2014, Class project for Stanford CS231N: convolutional neural networks for visual recognition, Winter semester 2014.5 (2014), pp. 1-7.*

Alba Nely Arévalo-Verjel et al., "Estimation of the Block Adjustment Error in UAV Photogrammetric Flights in Flat Areas," Jun. 16, 2022, Remote Sens. 2022, 14, 2877,pp. 1-11.*

Liu et al., "AE-GAN-Net: Learning Invariant Feature Descriptor to Match Ground Camera Images and a Large-Scale 3D Image-Based Point Cloud for Outdoor Augmented Reality," Remote Sensing, 2019, 23 pages.

Wang et al., "An Image Denoising Method Based on Deep Residual GAN," IWAACE, Journal of Physics: Conference Series, 2020, 7 pages.

Ackermann, "Combined Adjustment of Airborne Navigation Data and Photogrammetric Blocks," XVIth ISPRS Congress Technical Commission III, Working Group III/1, Jul. 1988, 13 pages.

Jiang et al., "Techniques and Applications of UAV-Based Photogrammetric 3D Mapping," MDPI Remote Sensing, 2022, 296 pages.

Wikipedia, "Generative adversarial network," Aug. 2023, 61 pages.

Mirza et al., "Conditional Generative Adversarial Nets," Machine Learning (cs.LG), Nov. 2014, 7 pages.

Wang et al., "High-Resolution Image Synthesis and Semantic Manipulation with Conditional GANs," Computer Vision and Pattern Recognition (cs.CV), Aug. 2018, 14 pages.

* cited by examiner

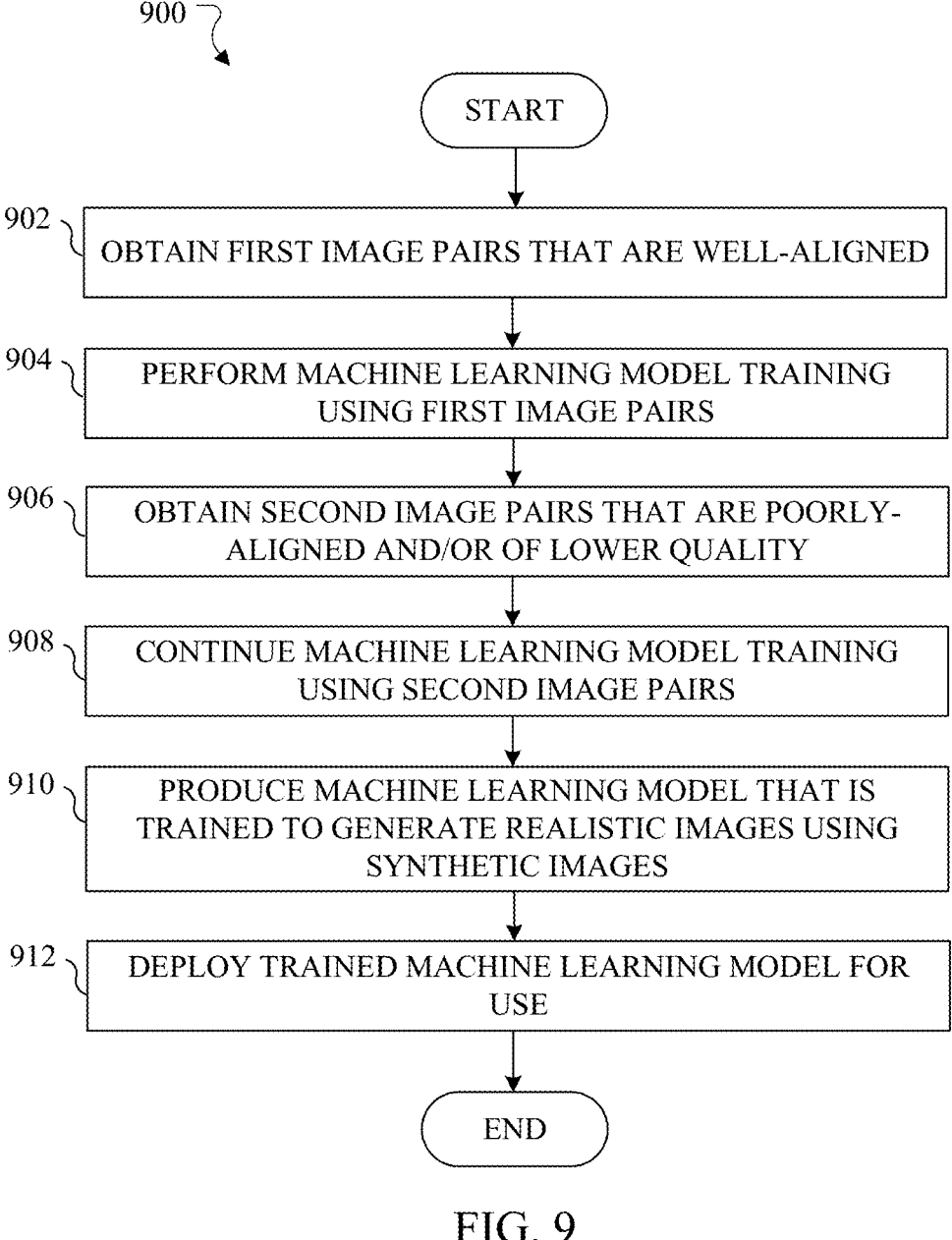

900

START

902  OBTAIN FIRST IMAGE PAIRS THAT ARE WELL-ALIGNED

904  PERFORM MACHINE LEARNING MODEL TRAINING USING FIRST IMAGE PAIRS

906  OBTAIN SECOND IMAGE PAIRS THAT ARE POORLY-ALIGNED AND/OR OF LOWER QUALITY

908  CONTINUE MACHINE LEARNING MODEL TRAINING USING SECOND IMAGE PAIRS

910  PRODUCE MACHINE LEARNING MODEL THAT IS TRAINED TO GENERATE REALISTIC IMAGES USING SYNTHETIC IMAGES

912  DEPLOY TRAINED MACHINE LEARNING MODEL FOR USE

END

FIG. 9

SYNTHETIC-TO-REALISTIC IMAGE CONVERSION USING GENERATIVE ADVERSARIAL NETWORK (GAN) OR OTHER MACHINE LEARNING MODEL

TECHNICAL FIELD

This disclosure is generally directed to machine learning systems and processes. More specifically, this disclosure is directed to synthetic-to-realistic image conversion using a generative adversarial network (GAN) or other machine learning model.

BACKGROUND

Numerous devices include navigation systems that use signals from satellites for geolocation, such as navigation systems that use Global Positioning System (GPS) receivers or other Global Navigation Satellite System (GNSS) receivers. For example, it is routine for airplanes, drones, missiles, and other flight vehicles to use GNSS-based navigation systems in order to identify where the flight vehicles are located and to control movements of the flight vehicles, such as along desired paths of travel. Unfortunately, it is becoming common for jamming, spoofing, or other interference to affect the usage of GNSS-based navigation signals. When this occurs, the flight vehicles may be said to be operating in "GNSS-denied environments." Among other things, this can interfere with or prevent desired operations involving the GNSS-based navigation signals and can lead to a loss of navigation for the flight vehicles.

SUMMARY

This disclosure relates to synthetic-to-realistic image conversion using a generative adversarial network (GAN) or other machine learning model.

In a first embodiment, a method includes obtaining training data having first image pairs, where each of the first image pairs includes (i) a first training image and (ii) a first ground truth image. The method also includes training a machine learning model to generate realistic images using the first image pairs. The method further includes obtaining additional training data having second image pairs, where each of the second image pairs includes (i) a second training image and (ii) a second ground truth image. At least some of the images in the second image pairs are less aligned or of lower quality than at least some of the images in the first image pairs. In addition, the method includes continuing to train the machine learning model to generate the realistic images using the second image pairs. In related embodiments, a non-transitory machine-readable medium contains instructions that when executed cause at least one processor to perform the method of the first embodiment.

In a second embodiment, an apparatus includes at least one memory and at least one processing device. The at least one memory is configured to store training data having first image pairs, where each of the first image pairs includes (i) a first training image and (ii) a first ground truth image. The at least one memory is also configured to store additional training data having second image pairs, where each of the second image pairs includes (i) a second training image and (ii) a second ground truth image. At least some of the images in the second image pairs are less aligned or of lower quality than at least some of the images in the first image pairs. The at least one processing device is configured to train a machine learning model to generate realistic images using the first image pairs. The at least one processing device is also configured to continue to train the machine learning model to generate the realistic images using the second image pairs.

In a third embodiment, a method includes obtaining one or more synthetic images of an environment. The method also includes generating one or more realistic images of the environment based on the one or more synthetic images using a trained machine learning model. The method further includes obtaining one or more actual images of the environment. In addition, the method includes determining at least one characteristic of a flight vehicle based on the one or more realistic images of the environment and the one or more actual images of the environment. In related embodiments, an apparatus includes at least one processing device configured to perform the method of the third embodiment. In other related embodiments, a non-transitory machine-readable medium contains instructions that when executed cause at least one processor to perform the method of the third embodiment.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 9 illustrates an example method for training a machine learning model to support synthetic-to-realistic image conversion according to this disclosure.

DETAILED DESCRIPTION

Figure 1:
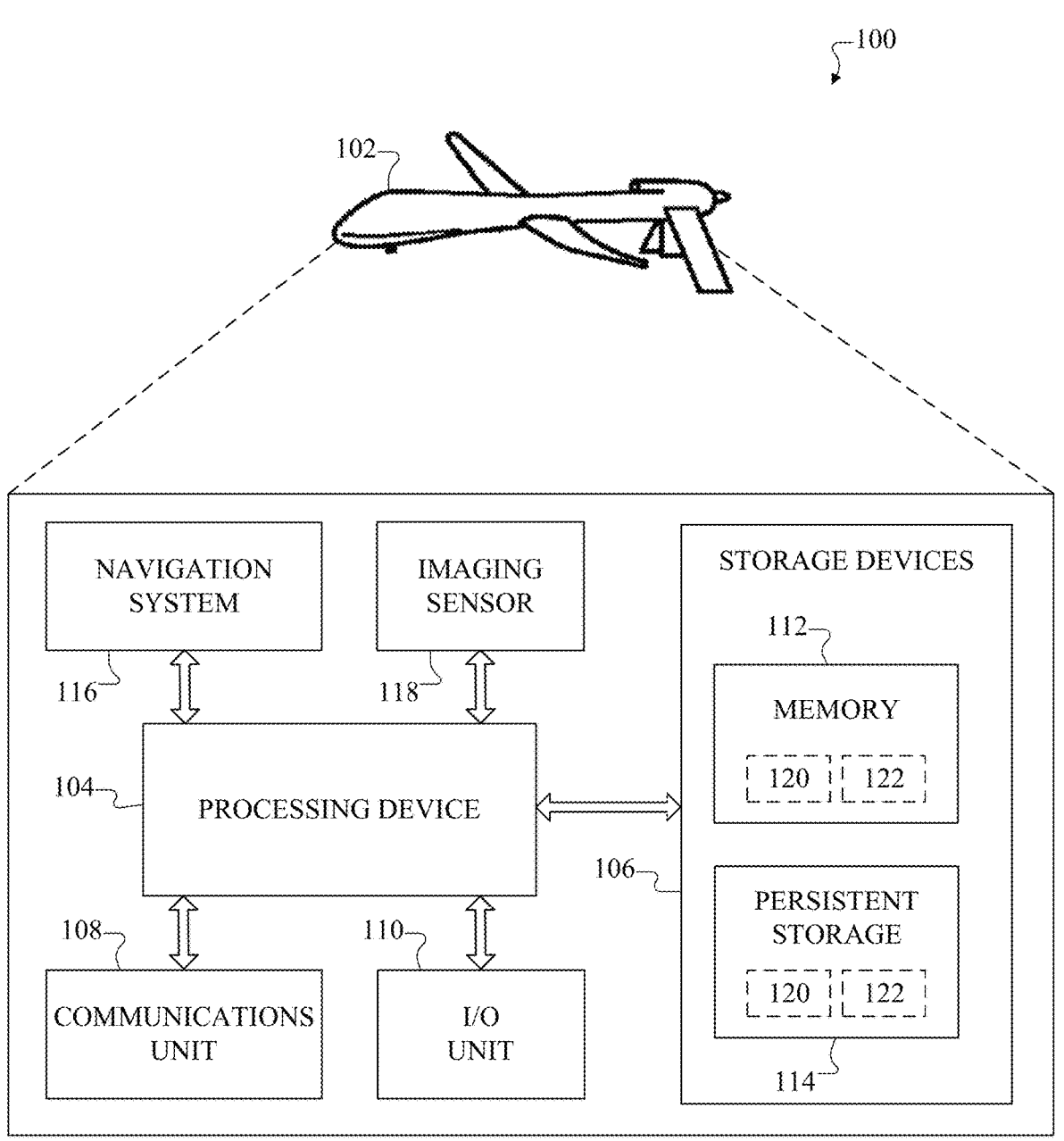
FIG. 1 illustrates an example system supporting synthetic-to-realistic image conversion using a generative adversarial network (GAN) or other machine learning model according to this disclosure.

FIGS. 1 through 10, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, numerous devices include navigation systems that use signals from satellites for geolocation, such as navigation systems that use Global Positioning System (GPS) receivers or other Global Navigation Satellite System (GNSS) receivers. For example, it is routine for airplanes, drones, missiles, and other flight vehicles to use GNSS-based navigation systems in order to identify where the flight vehicles are located and to control movements of the flight vehicles, such as along desired paths of travel. Unfortunately, it is becoming common for jamming, spoofing, or other interference to affect the usage of GNSS-based navigation signals. When this occurs, the flight vehicles may be said to be operating in "GNSS-denied environments." Among other things, this can interfere with or prevent desired operations involving the GNSS-based navigation signals and can lead to a loss of navigation for the flight vehicles.

Various approaches have been developed to provide navigation assistance to flight vehicles in GNSS-denied environments or to flight vehicles operating under other adverse conditions. For example, in some approaches, actual images can be captured by a flight vehicle and compared to synthetic images, where the synthetic images are generated using a three-dimensional (3D) model (such as a 3D point cloud) associated with a given environment. By comparing the actual images captured by the flight vehicle to the synthetic images, it is possible to register the location of the flight vehicle relative to one or more known locations and to identify the orientation of the flight vehicle, which supports the estimation of a position and a direction of travel of the flight vehicle. For example, the 3D model may be used to generate synthetic images containing buildings, terrain, or other structures in a given environment from different positions relative to the structures, and actual images of those buildings, terrain, or other structures may be captured and compared to the synthetic images in order to estimate the location and orientation of a flight vehicle relative to the structures.

Unfortunately, it is common for synthetic images generated using a 3D model to exhibit various artifacts. These artifacts may be due to a number of factors, such as voids between content within a 3D point cloud, mismatched modalities, and spurious points within a 3D point cloud. While these factors may typically be more common in 3D point clouds generated using satellites, these factors can still be present in 3D point clouds generated in other ways. The artifacts within the synthetic images can confound registration and make it more difficult or impossible to accurately estimate the location of a flight vehicle that captures actual images and compares the actual images to the synthetic images. For instance, in order to produce accurate location estimates, matched points between a synthetic image and an actual image are typically identified, and artifacts in the synthetic image may complicate this feature matching process.

This disclosure provides various techniques for synthetic-to-realistic image conversion using a generative adversarial network (GAN) or other machine learning model. As described in more detail below, a machine learning model (such as a conditional GAN or other GAN) may be trained to generate realistic images based on synthetic images, such as those produced using one or more 3D point clouds or other 3D models. For example, training data that includes well-aligned pairs of images may be used to initially train a GAN or other machine learning model. Each pair of images used for training here may include (i) a training image to be processed by the machine learning model in order to generate an output image and (ii) a ground truth (real) image representing a desired output image to be generated by the machine learning model. These images are referred to as being "well-aligned" since there may be little if any translational or rotational offsets between the images in each pair.

The well-aligned image pairs may be produced based on 3D models have higher fidelity and lower noise. This process helps to train the GAN or other machine learning model to generate realistic images based on synthetic images.

As training progresses, additional pairs of images may be introduced into the training data. Again, each additional pair of images used for training here may include (i) a training image to be processed by the machine learning model in order to generate an output image and (ii) a ground truth image representing a desired output image to be generated by the machine learning model. However, at least some of these additional pairs of images may be produced based on 3D models with lower fidelity and higher noise, such as when the 3D models are noisier and/or have larger spacings between points in 3D point clouds. This process helps to train the GAN or other machine learning model to generate realistic images based on synthetic images even in the presence of noise, low-quality 3D point clouds or other 3D models, or other issues. During this latter part of the training, an L1 loss (also referred to as the absolute error loss) can be de-weighted or given less importance when calculating loss values used during the training.

In this way, the described techniques can be used to train a GAN or other machine learning model for use in generating realistic images from synthetic images. The realistic images can be generated with significantly fewer artifacts compared to other approaches, which can significantly increase the quality of the realistic images. The realistic images may be used in any suitable manner and for any suitable purpose(s). For example, the realistic images may be generated for known positions using a 3D point cloud of an environment, and the realistic images can be compared to actual images of the environment captured by a flight vehicle in order to estimate a position or orientation of the flight vehicle. As a particular example, in applications like navigation, the ability to obtain realistic images with increased quality can enable more effective point matching between the realistic and actual images, which can provide improved results in the determination of the positions or orientations of flight vehicles.

FIG. 1 illustrates an example system 100 supporting synthetic-to-realistic image conversion using a GAN or other machine learning model according to this disclosure. As shown in FIG. 1, the system 100 includes or is used in conjunction with a flight vehicle 102. In this example, the flight vehicle 102 represents a drone. However, the flight vehicle 102 may represent an airplane, missile, or any other platform that can use GNSS-based navigation signals or other navigation signals in order to identify where the platform is located and to optionally control movements of the platform.

The flight vehicle 102 can include a number of components and subsystems to support various operations of the flight vehicle 102. In this example, the flight vehicle 102 includes at least one processing device 104, at least one storage device 106, at least one communications unit 108, and at least one input/output (I/O) unit 110. The processing device 104 may execute instructions that can be loaded into a memory 112. The processing device 104 includes any suitable number(s) and type(s) of processors or other processing devices in any suitable arrangement. Example types of processing devices 104 include one or more microprocessors, microcontrollers, digital signal processors (DSPs), application specific integrated circuits (ASICs), field programmable gate arrays (FPGAs), or discrete circuitry.

The memory 112 and a persistent storage 114 are examples of storage devices 106, which represent any structure(s) capable of storing and facilitating retrieval of information (such as data, program code, and/or other suitable information on a temporary or permanent basis). The memory 112 may represent a random access memory or any other suitable volatile or non-volatile storage device(s). The persistent storage 114 may contain one or more components or devices supporting longer-term storage of data, such as a read only memory, hard drive, Flash memory, or optical disc.

The communications unit 108 supports communications with other systems or devices. For example, the communications unit 108 can include a network interface card or a wireless transceiver facilitating communications over a wired or wireless network. The communications unit 108 may support communications through any suitable physical or wireless communication link(s).

The I/O unit 110 allows for input and output of data. For example, the I/O unit 110 may provide a connection for user input through a keyboard, mouse, keypad, touchscreen, or other suitable input device. The I/O unit 110 may also send output to a display or other suitable output device. Note, however, that the I/O unit 110 may be omitted if the flight vehicle 102 does not require local I/O.

The flight vehicle 102 also includes a navigation system 116. The navigation system 116 represents a GNSS-based navigation system or other navigation system that operates based on wireless navigation signals received from satellites or other navigation signal sources. For example, the navigation system 116 may include or represent a GPS receiver or other GNSS receiver. The processing device 104 may perform various operations based on information received from the navigation system 116. For instance, the processing device 104 may use information received from the navigation system 116 in order to identify whether the flight vehicle 102 is following a desired flight path and to make adjustments to the actual flight path of the flight vehicle 102 in order to follow the desired flight path.

The flight vehicle 102 further includes one or more imaging sensors 118. Each imaging sensor 118 may be used to capture one or more images of one or more scenes. Depending on the implementation, the flight vehicle 102 may include a single imaging sensor 118 or multiple imaging sensors 118. Each imaging sensor 118 represents any suitable device configured to capture images. Each imaging sensor 118 may capture images having any suitable resolution and any suitable form. As particular examples, each imaging sensor 118 may represent a camera or other imaging sensor configured to capture illumination in the visible spectrum of light, infrared spectrum of light, ultraviolet spectrum of light, or any combination thereof.

As described above, in GNSS-denied environments, the navigation system 116 may be unable to receive any valid navigation signals or an adequate number of valid navigation signals to enable geolocation or other navigation-related functions. This may be due to any number of factors, such as jamming, spoofing, or other interference. When these or other issues are detected or at any other suitable times, the processing device 104 may use at least one 3D point cloud or other 3D model 120 and at least one trained machine learning model 122. As described in more detail below, the processing device 104 can use the 3D model 120 to generate synthetic images of an environment, and the trained machine learning model 122 may convert the synthetic images into high-quality realistic images. The processing device 104 can compare the realistic images to actual images captured using the imaging sensor 118 in order to estimate where the flight vehicle 102 is located and the orientation of the flight vehicle 102. This allows the processing device 104 to achieve some level of navigation control even in GNSS-denied environments. Additional details regarding the use of the 3D model(s) 120 and the trained machine learning model(s) 122 are provided below.

Although FIG. 1 illustrates one example of a system 100 supporting synthetic-to-realistic image conversion using a GAN or other machine learning model, various changes may be made to FIG. 1. For example, the system 100 may involve the use of any other suitable flight vehicle or any other device or system in which high-quality realistic images are generated using synthetic images. This may or may not be done for navigation purposes. Also, various components and functions shown in FIG. 1 may be combined, further subdivided, replicated, rearranged, or omitted and additional components and functions may be added according to particular needs.

Figure 2:
FIGS. 2 through 4 illustrate example images that may be used to support image-based navigation according to this disclosure.
Figure 3:
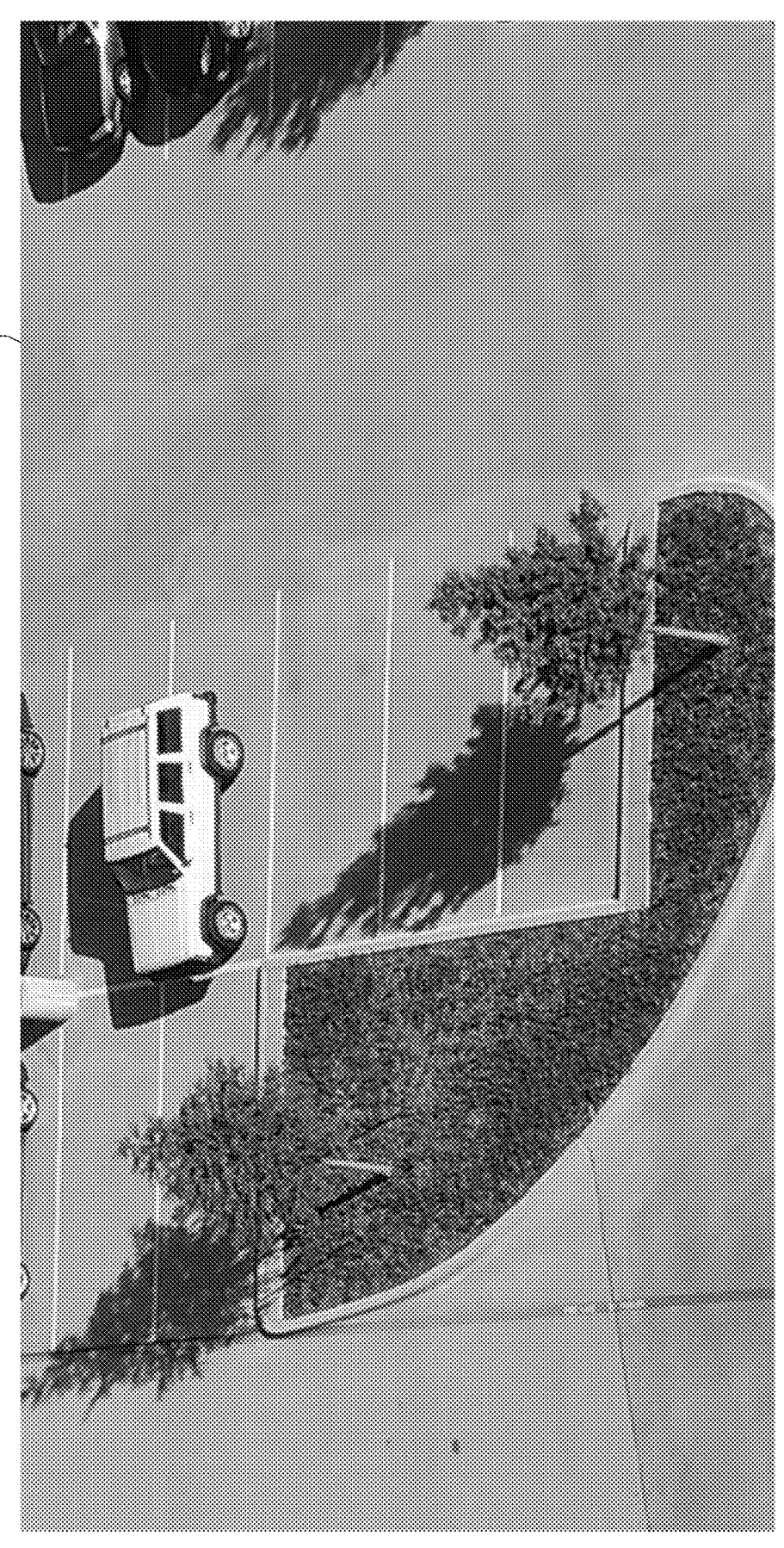
Figure 4:
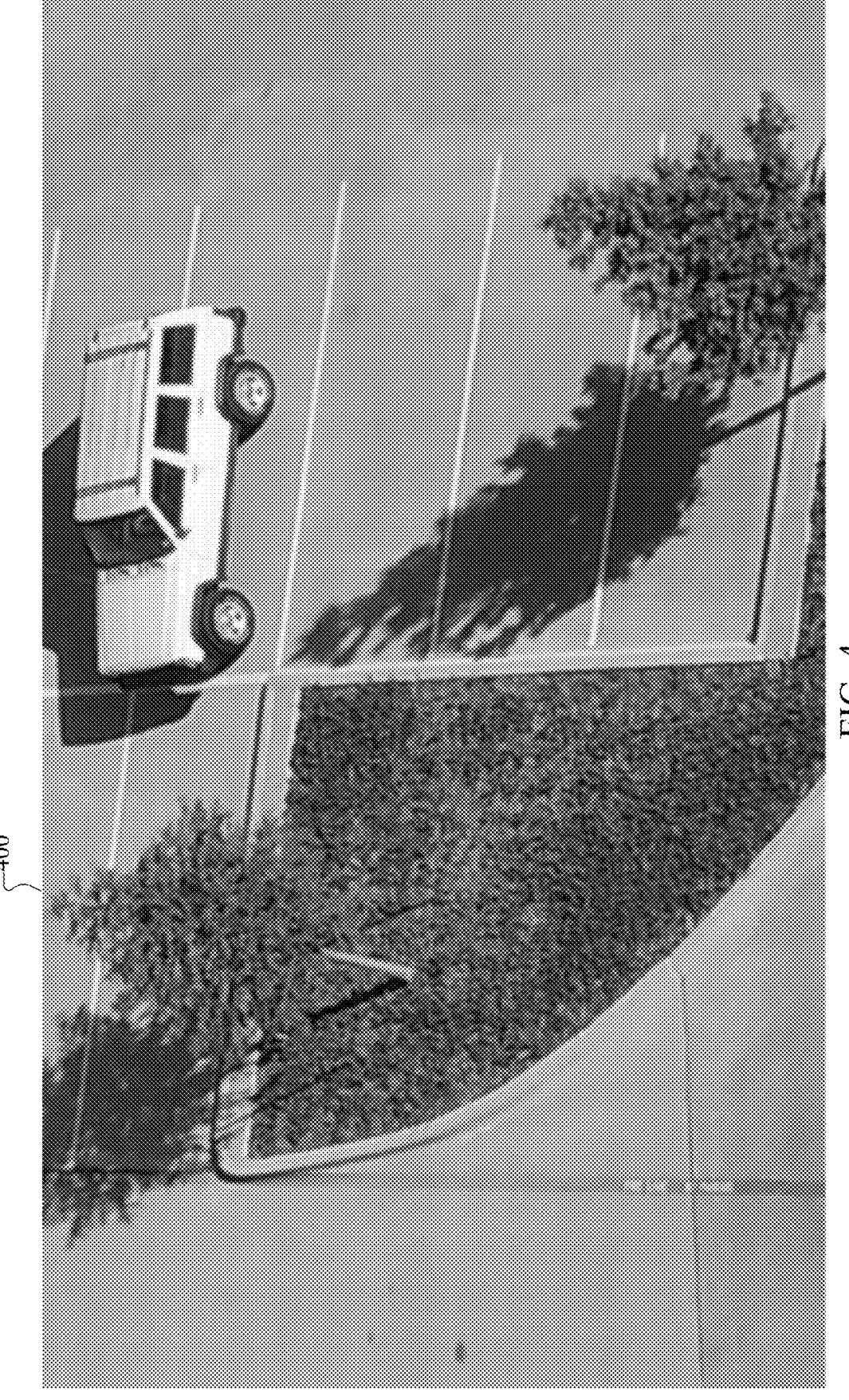

FIGS. 2 through 4 illustrate example images 200, 300, 400 that may be used to support image-based navigation according to this disclosure. For example, the images 200, 300, 400 may be used by the processing device 104 when the navigation system 116 of the flight vehicle 102 is unable to determine a location of the flight vehicle 102. Of course, the images 200, 300, 400 may be used by the processing device 104 at any other suitable times, such as to verify a location and direction of travel as determined by the navigation system 116. Also, as noted above, synthetic-to-realistic image conversion functionality may be used for purposes other than navigation.

As shown in FIGS. 2 and 3, an image 200 represents a synthetic image, such as one generated using a 3D model 120. Also, an image 300 represents an actual image, such as one captured using an imaging sensor 118. In some cases, the synthetic image 200 generated using the 3D model 120 may be produced by the processing device 104, such as when the processing device 104 applies the 3D model 120 associated with a specific environment to an image and generates a synthetic image of that environment. In some approaches, the processing device 104 might attempt to estimate a location of a flight vehicle 102 within an environment using the synthetic image 200. For example, the processing device 104 might generate multiple synthetic images 200 and determine which synthetic image 200 appears most similar to the actual image 300. The processing device 104 might also attempt to estimate the orientation (and therefore the direction of travel) of the flight vehicle 102, such as based on the orientations of the image contents within the images 200 and 300. Essentially, the processing device 104 attempts to use the images 200 and 300 as a navigational aid, which may involve determination of a precise alignment of the images 200 and 300.

Unfortunately, as can be seen in FIG. 2, synthetic images 200 often have a number of artifacts. For example, the synthetic image 200 shown in FIG. 2 has a number of voids where image data is missing. The synthetic image 200 shown in FIG. 2 also fails to reproduce various objects with precision. As noted above, navigation aid is typically achieved using matched points (also called tie points) between synthetic images 200 and actual images 300, but the presence of these artifacts in the synthetic images 200 can interfere with the identification of a number of matched points.

As described in more detail below, one or more trained machine learning models 122 may be used to convert synthetic images 200 into cleaner, more-realistic images. For example, FIG. 4 illustrates an example image 400 that may be generated using a trained machine learning model 122. Here, the image 400 may be generated based on a synthetic image, such as the synthetic image 200 or a synthetic image generated in the same or similar manner as the synthetic image 200. As can be seen here, the image 400 is much cleaner, lacks many or all of the artifacts included in the synthetic image 200, and looks much more realistic overall than the synthetic image 200 due to the presence of additional image data within the image 400. Because of this, the identification of matched points between machine learning model-generated images 400 and actual images 300 may occur more accurately, which can improve the location and orientation estimates generated by the processing device 104.

Although FIGS. 2 through 4 illustrate examples of images 200, 300, 400 that may be used to support image-based navigation, various changes may be made to FIGS. 2 through 4. For example, the contents of the images 200, 3M), 400 are examples only and merely meant to illustrate various functionalities described in this patent document. The contents of the images 200, 300, 400 may vary widely based on the circumstances.

Figure 5:
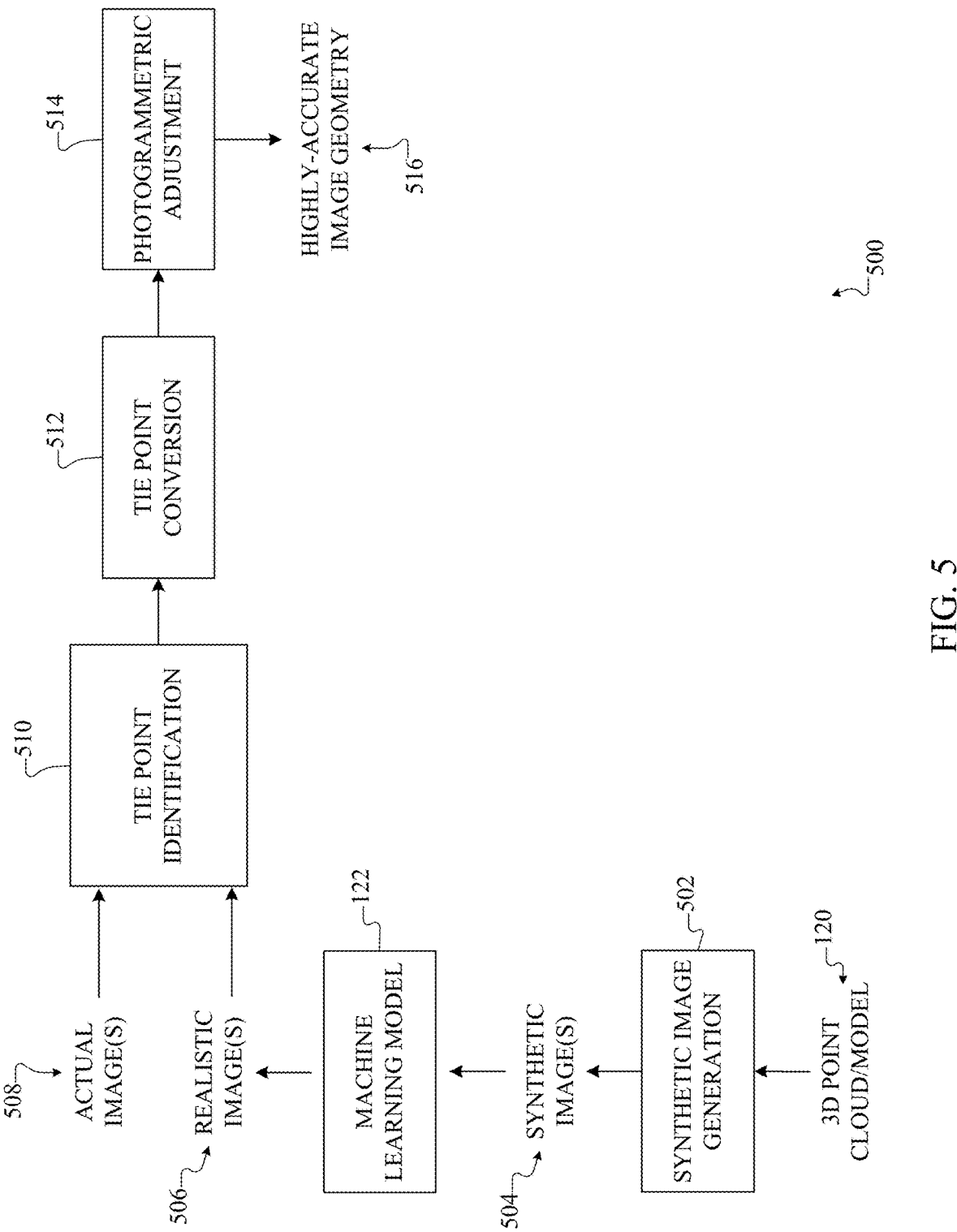
FIG. 5 illustrates an example architecture supporting image-based navigation using synthetic-to-realistic image conversion according to this disclosure.

FIG. 5 illustrates an example architecture 500 supporting image-based navigation using synthetic-to-realistic image conversion according to this disclosure. For example, the architecture 500 may be used by the flight vehicle 102 to perform image-based navigation. However, image-based navigation using synthetic-to-realistic image conversion may be used by any other suitable flight vehicles or other platforms as needed or desired. Also, as noted above, the synthetic-to-realistic image conversion functionality described here may be used for other purposes and is not limited to use with image-based navigation.

As shown in FIG. 5, the architecture 500 generates, obtains, or otherwise has access to a 3D point cloud or other 3D model 120. A synthetic image generation function 502 uses the 3D model 120 to generate one or more synthetic images 504. The synthetic image generation function 502 may use any suitable technique to generate synthetic images 504, such as by up-projecting the 3D model 120 using imaging geometry metadata (like an inverse map projection and rational functions). Each synthetic image 504 (as with the synthetic image 200) may be of relatively low quality, such as when each synthetic image 504 includes a number of artifacts. As described above, this may be due to a number of factors, such as voids between content within the 3D model 120, mismatched modalities, and spurious points within the 3D model 120. Thus, at least one trained machine learning model 122 is used to process the one or more synthetic images 504 and generate one or more realistic images 506. Each realistic image 506 (as with the realistic image 400) ideally is of higher quality, such as when each realistic image 506 lacks a substantial number of artifacts contained in the corresponding synthetic image 504. In general, each realistic image 506 represents an image with fewer 3D point cloud rendering-related artifacts or other similar artifacts. The architecture 500 also receives one or more actual images 508, such as one or more images captured using at least one imaging sensor 118.

The realistic and actual images 506 and 508 are provided to a tie point identification function 510, which generally operates to identify specific tie points in the realistic images 506 that are also present in the actual images 508 (or vice versa). For example, the tie point identification function 510 may identify specific tie points associated with buildings, roads, vehicles, or other manmade objects and/or specific tie points associated with terrain or other natural landmarks in the images 506 and 508. A tie point conversion function 512 generally operates to convert the identified tie points into ground control points (GCPs), which may represent known 3D points with known geodetic coordinates (such as latitude, longitude, and height). In some cases, the tie point conversion function 512 can convert the identified tie points to ground control points using the closest 3D points to those tie points within the 3D model 120.

A photogrammetric adjustment function 514 analyzes information (such as the converted tie points) in order to produce a highly-accurate image geometry 516. For example, the photogrammetric adjustment may use the ground control points and tie points to correct for errors in platform position and orientation metadata. Based on that information, the photogrammetric adjustment function 514 can estimate a position and orientation of the flight vehicle 102 when the actual image 508 was captured, which can be used for navigation purposes or other functions. Note that photogrammetric processing pipelines typically do not integrate machine learning models due to the difficulty in performing machine learning validation and due to the "black box" nature of neural networks or other machine learning models.

Note that the various functions shown in or described with respect to FIG. 5 may be implemented in any suitable manner and use any suitable techniques for performing the described functions. Specific examples of approaches for performing certain functions shown in or described with respect to FIG. 5 may be found in U.S. Pat. Nos. 9,269,145; 9,275,267; 11,042,998; 11,127,145; and 11,538,135 (all of which are hereby incorporated by reference in their entirety).

Although FIG. 5 illustrates one example of an architecture 500 supporting image-based navigation using synthetic-to-realistic image conversion, various changes may be made to FIG. 5. For example, various components and functions shown in FIG. 5 may be combined, further subdivided, replicated, rearranged, or omitted and additional components and functions may be added according to particular needs.

Figures 6A, 6B:
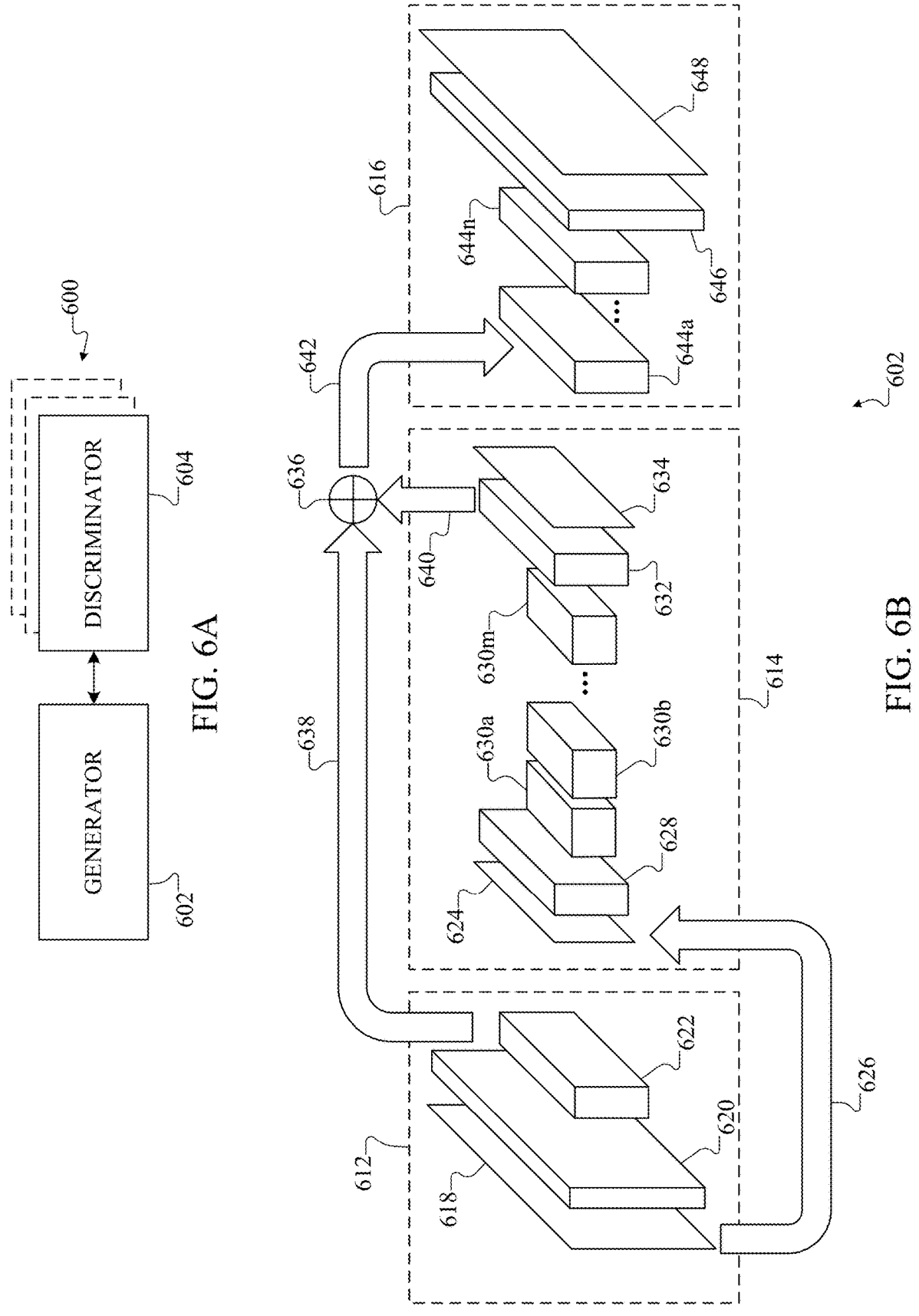
FIGS. 6A and 6B illustrate an example machine learning model supporting synthetic-to-realistic image conversion according to this disclosure.

FIGS. 6A and 6B illustrate an example machine learning model 600 supporting synthetic-to-realistic image conversion according to this disclosure. For example, the machine learning model 600 here may be used as a machine learning model 122 in the flight vehicle 102 shown in FIG. 1, such as when used within the architecture 500 shown in FIG. 5. However, the machine learning model 600 may be used in any suitable device or system and for any suitable purpose (s), which may or may not relate to navigation.

As shown in FIG. 6A, the machine learning model 600 generally represents a generative adversarial network that includes a generator 602 and a discriminator 604. The generator 602 represents a machine learning model structure or network that is trained to generate realistic images, and the discriminator 604 represents a machine learning model structure or network that is trained to distinguish the generator's artificial images from actual images. During training, the generator 602 and the discriminator 604 may be trained adversarially, meaning the generator 602 attempts to learn how to fool the discriminator 604 while the discriminator 604 attempts to learn how to distinguish images more effectively. Ideally, during the training, the generator 602 becomes better at generating realistic images, and the discriminator 604 becomes less able to accurately distinguish artificial images from actual images. In some embodiments, the use of multiple discriminators 604 may be supported, such as where different discriminators 604 analyze image data at different scales. In particular embodiments, the machine learning model 600 takes the form of a conditional generative adversarial network (cGAN), which refers to a type of generative adversarial network in which additional information is used to help guide the image generation process used by the generator 602.

As shown in FIG. 6B, one example embodiment of the generator 602 in the machine learning model 600 includes three networks 612, 614, 616. The network 612 of the generator 602 is configured to receive synthetic images 618, which can represent synthetic images like the images 200 or 504 described above. The synthetic images 618 are processed using one or more convolution layers 620 and one or more residual blocks 622. The one or more convolution layers 620 generally perform convolutions to the image data contained in the images 618, which results in the generation of various features. The one or more residual blocks 622 generally process the resulting features to produce residuals, which may be accomplished by having the one or more residual blocks 622 learn residual functions with reference to training features that are input to the one or more residual blocks 622.

The network 614 of the generator 602 is configured to receive images 624, which represent down-converted versions of the synthetic images 618. For example, a down-sampling operation 626 may be used to reduce the resolution of the synthetic images 618 in order to generate the images 624. The images 624 are processed using one or more convolution layers 628, multiple residual blocks 630a-630m, and one or more deconvolution layers 632. The one or more convolution layers 628 generally perform convolutions to the image data contained in the images 624, which results in the generation of various features. The residual blocks 630a-630m generally process the resulting features to produce residuals, which are processed using deconvolutions by the one or more deconvolution layers 632. This results in the generation of images 634, which may represent more realistic versions of the images 624.

A combiner 636 generally operates to combine outputs 638 from the one or more residual blocks 622 with outputs 640 (which represent or include the images 634) from the one or more deconvolution layers 632 to produce combined results 642. The network 616 of the generator 602 is configured to receive the combined results 642, which are processed using multiple residual blocks 644a-644n. The residual blocks 644a-644n generally process the combined results 642 to produce residuals, and the residuals are processed using deconvolutions by one or more deconvolution layers 646. This results in the generation of images 648, which may represent realistic versions of the images 618. For example, the images 648 may represent the images 400 or 506 described above.

In this way, the generator 602 of the machine learning model 600 can be trained to generate images 648 that represent more realistic versions of the synthetic images 618. Once trained, the generator 602 of the machine learning model 600 (which itself represents a trained machine learning model) can be deployed for use by any suitable platforms, and the realistic images 648 that are generated by the trained machine learning model may be used for any suitable purposes. For example, the trained machine learning model may be used as shown in FIG. 5 to generate realistic images 648 that allow for estimation of the location and orientation of a flight vehicle 102. However, the trained machine learning model and the realistic images may be used in any other suitable manner, regardless of whether the trained machine learning model and the realistic images are used for navigation purposes.

In some embodiments, to train the machine learning model 600, training data that includes pairs of images may be provided to the machine learning model 600. Each pair of images can include a training image and a ground truth image. Each training image represents an image to be processed by the machine learning model 600 in order to generate a more realistic image, and each corresponding ground truth image represent a desired output to be generated by the machine learning model 600. As particular examples, each training image may represent a synthetic image 618 to be processed by the generator 602, and each corresponding ground truth image may represent the desired image to be produced by the generator 602. The discriminator 604 may compare the actual image 648 produced by the generator 602 to the ground truth image when attempting to determine whether the actual image 648 produced by the generator 602 is real or artificial. As noted above, the pairs of images here can be well-aligned, meaning there may be little or no translational or rotational offsets between the images in each pair. Using these image pairs, the various convolution, residual block, and deconvolution layers of the generator 602 can be trained to more accurately generate the images 648 based on the training images.

As training progresses, additional pairs of images can be introduced into the training data being used to train the machine learning model 600. Again, each additional pair of images may include a training image and a ground truth image. Here, however, at least some of the training images may have lower quality compared to the original training images used earlier, and/or the images in the image pairs may be more poorly aligned with each other compared to the original image pairs used earlier (which supports the creation of a conditional GAN). Using these additional image pairs, the various convolution, residual block, and deconvolution layers of the generator 602 can be further trained to more accurately generate images 648 based on the additional training images, even in the presence of noise, misalignment, or other issues.

During the portion of the training involving the additional image pairs, the L1 loss can be de-weighted or given less importance when calculating loss values used during the training. For example, a loss function may be used to calculate loss values during the initial and subsequent portions of the training. In some cases, the loss function may base the loss values on errors or differences between the expected and actual outputs of the generator 602. The loss function may also base the loss values on differences between features actually generated for the training images and features that should have been generated for the training images. Both types of errors can be used to generate loss values associated with operation of the machine learning model 600. Also, in some cases, each loss value can be compared to a threshold in order to determine if the machine learning model 600 has been trained to achieve a desired level of accuracy. If a loss value exceeds the threshold, weights or other parameters of the machine learning model 600 can be adjusted, and the same or additional training images can be provided to the machine learning model 600. An additional loss value may be generated and compared to the threshold, and weights or other parameters of the machine learning model 600 can again be adjusted if the loss value exceeds the threshold. Ideally, over time, the loss value decreases and eventually falls below the threshold, at which point the machine learning model 600 may be adequately trained.

In some embodiments, the training of a machine learning model 600 that includes a generator 602 and multiple discriminators 604 may involve the use of a loss function based on both GAN losses and feature matching losses. As a particular example, the loss function used to train such a machine learning model 600 may have the following form.

$$\mathcal{L}_{total} = \min_G \left( \left( \max_{D_1,D_2,D_3} \sum_{k=1,2,3} \mathcal{L}_{GAN}(G, D_k) \right) + \lambda \sum_{k=1,2,3} \mathcal{L}_{FM}(G, D_k) \right) \quad (1)$$

Here:

$$\mathcal{L}_{GAN}(G, D_k) = \mathbb{E}_{(s,x)}[\log D(s, x)] + \mathbb{E}_s[\log (1 - D(s, G(s))] \quad (2)$$

$$\mathcal{L}_{FM}(G, D_k) = \mathbb{E}_{(s,x)} \sum_{i=1}^T \frac{1}{N_i} [\|D_k^{(i)}(s, x) - D_k^{(i)}(s, G(s))\|_1] \quad (3)$$

In Equations (1)-(3), $\mathcal{L}_{total}$ represents a total loss value, $\mathcal{L}_{GAN}$ represents a generative adversarial network loss value, and $\mathcal{L}_{FM}$ represents a feature matching loss value. Also, G represents the generator 602, and $D_k$ represents one of multiple discriminators 604 (there are three discriminators 604 identified as $D_1$, $D_2$, and $D_3$ in this example). Further, $\lambda$ represents an adaptive hyperparameter that can be adjusted during training. In addition, s represents a synthetic image, x represents an actual image, and $D_k^{(i)}$ represents an $i^{th}$ feature layer of the $k^{th}$ discriminator. The value of $\lambda$ used here can be adjusted during training based on the alignment of the images contained in the training data being used. As a result, when images in a training pair do not match well in spatial terms, the feature matching loss value $\mathcal{L}_{FM}$ can be de-weighted. For example, when the images in the training data being used during training are well-aligned, the value of $\lambda$ may be relatively high (such as a value of 40). When the images in the training data being used during training are poorly-aligned, the value of $\lambda$ may be relatively small (such as a value of 0.66). Essentially, $\lambda$ represents an additional hyperparameter that is used to account for misalignment of images in training pairs during training. Note that the particular values for % above are examples only and can vary as needed or desired.

This specific approach for training a conditional GAN-based machine learning model can provide various benefits or advantages depending on the implementation. For example, the machine learning model can be trained to convert images between domains without introducing hallucinations by using matching pairs for training. Moreover, matching synthetic/actual image pairs may be used as easy cases for training the machine learning model, and these cases can be aligned using heuristic techniques. The machine learning model can also be applied to cases in which the heuristic techniques fail.

The training data that is used to train the machine learning model 600 may be generated or otherwise obtained in any suitable manner. For example, various ones of the patents incorporated by reference above describe processes for registering two-dimensional (2D) images with 3D point clouds (which creates synthetic images in the process), as well as for performing geometric adjustments that operate on ground control points from registration. Using these techniques, well-aligned image pairs may be generated by performing registration using original image geometries, applying geometric adjustments to the image geometries, and performing registration again using the adjusted image geometries. These operations can occur using 3D point clouds or other 3D models having higher fidelity and less noise. Assuming the geometric adjustments are correct, the synthetic images generated during the second registration process should be well-aligned with each other. Additional image pairs that are poorly aligned or of lower quality may also be produced, such as by using 3D point clouds or other 3D models having lower fidelity and more noise. Note, however, that the images used during training may be obtained using any other suitable automated or manual techniques.

Although FIGS. 6A and 6B illustrate one example of a machine learning model 600 supporting synthetic-to-realistic image conversion, various changes may be made to FIGS. 6A and 6B. For example, various components and functions shown in FIGS. 6A and 6B may be combined, further subdivided, replicated, rearranged, or omitted and additional components and functions may be added according to particular needs. Also, while FIGS. 6A and 6B illustrate one example architecture for a machine learning model 600 supporting synthetic-to-realistic image conversion, other machine learning models may be designed to support synthetic-to-realistic image conversion using any other suitable machine learning model architectures.

Figure 7:
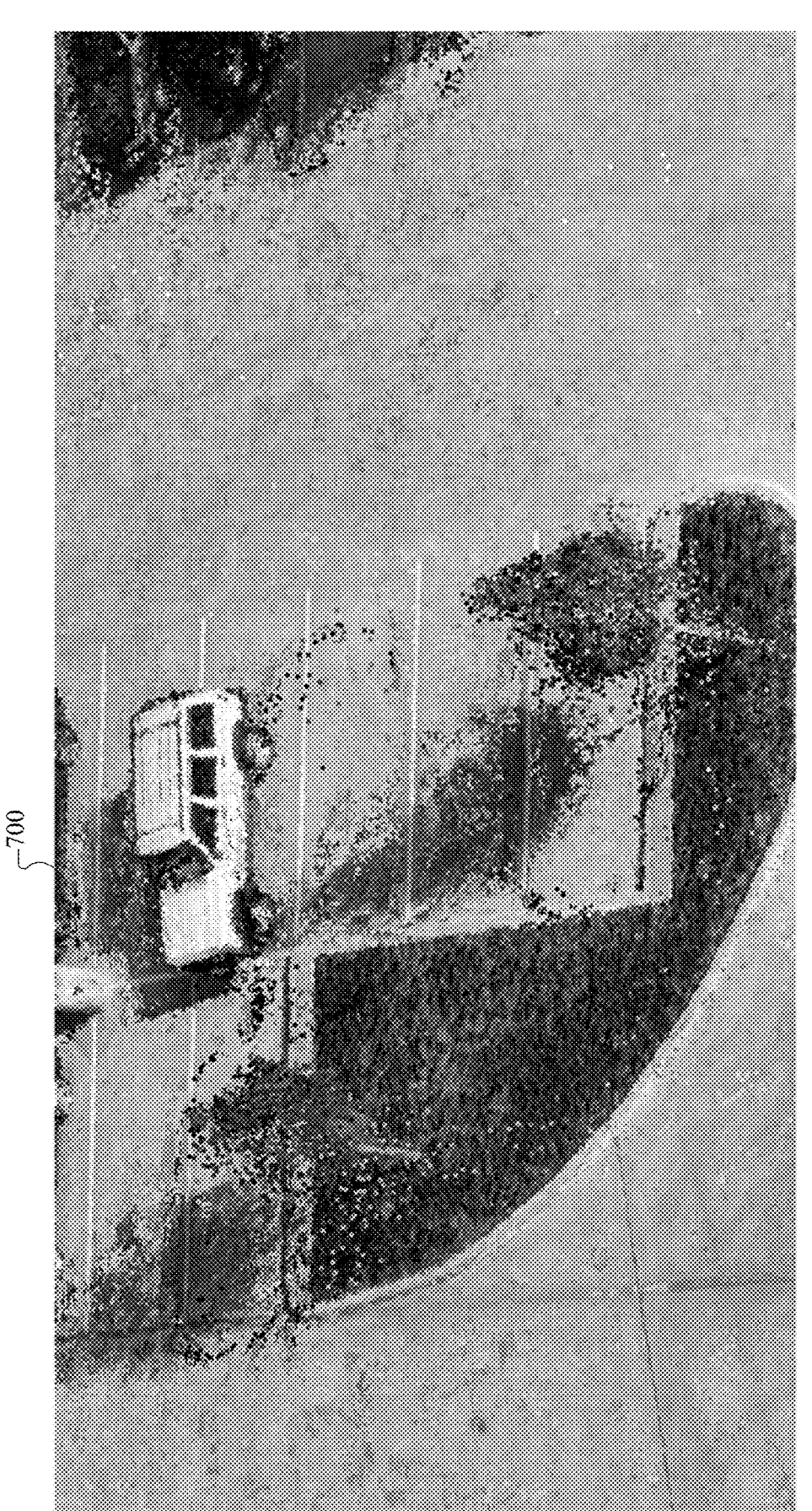
FIGS. 7 and 8 illustrate example images that may be associated with a trained machine learning model to support synthetic-to-realistic image conversion according to this disclosure.
Figure 8:
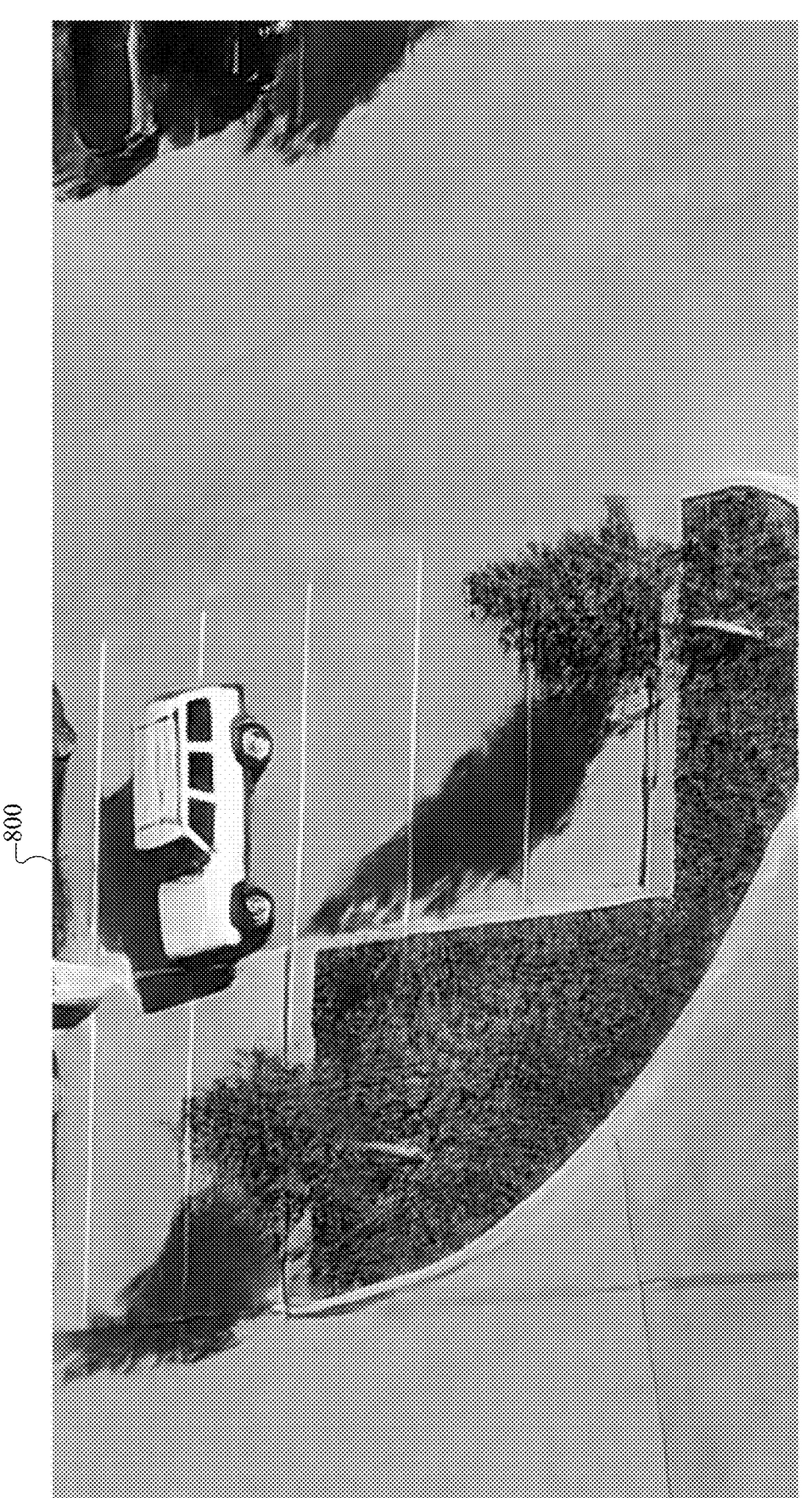

FIGS. 7 and 8 illustrate example images 700 and 800 that may be associated with a trained machine learning model to support synthetic-to-realistic image conversion according to this disclosure. For example, the image 700 may represent a synthetic image 618 provided to the generator 602, and the image 800 may represent an actual image 648 generated by the generator 602.

As can be seen here, the realistic image 800 is much more realistic and lacks many or all of the artifacts contained in the original synthetic image 700. As a result, the realistic image 800 may be used in place of the original synthetic image 700 when performing one or more image processing operations or other operations. For example, the realistic image 800 may represent a realistic image 506 that is processed by the functions 510-514 in the architecture 500 of FIG. 5. Given the quality of the realistic image 800 relative to the original synthetic image 700 (which may represent a synthetic image 504), the results obtained using the functions 510-514 in the architecture 500 of FIG. 5 can be improved (oftentimes significantly).

Although FIGS. 7 and 8 illustrate examples of images 700 and 800 that may be associated with a trained machine learning model to support synthetic-to-realistic image conversion, various changes may be made to FIGS. 7 and 8. For example, the contents of the images 700 and 800 are examples only and merely meant to illustrate various functionalities described in this patent document. The contents of the images 700 and 800 may vary widely based on the circumstances.

It should be noted that the functions shown in or described with respect to FIGS. 1 through 8 can be implemented in any suitable device(s) and in any suitable manner. For example, in some embodiments, at least some of the functions shown in or described with respect to FIGS. 1 through 8 can be implemented or supported using one or more software applications or other software instructions that are executed by one or more processors of an electronic device. In other embodiments, at least some of the functions shown in or described with respect to FIGS. 1 through 8 can be implemented or supported using dedicated hardware components. In general, the functions shown in or described with respect to FIGS. 1 through 8 can be performed using any suitable hardware or any suitable combination of hardware and software/firmware instructions. Also, the functions shown in or described with respect to FIGS. 1 through 8 can be performed by a single device or by multiple devices, such as when one electronic device (like a server) trains a machine learning model and another electronic device (like a flight vehicle) uses at least a portion of the machine learning model during inferencing.

FIG. 9 illustrates an example method 900 for training a machine learning model to support synthetic-to-realistic image conversion according to this disclosure. For ease of explanation, the method 900 is described as being performed using a server or other device, which may include various components shown in FIG. 1 (such as the components 104-114), in order to train the machine learning model 600 shown in FIGS. 6A and 6B. However, the method 900 may be performed using any other suitable device(s) or system(s), and the method 900 may be used to train any other suitable machine learning model(s).

As shown in FIG. 9, first image pairs are generated, received, or otherwise obtained at step 902. This may include, for example, the processing device 104 of a server or other device generating, receiving, or otherwise obtaining image pairs that are well-aligned. The first image pairs may include any suitable number of image pairs, and each pair may include a training image and a ground truth image. Machine learning model training is performed using the first image pairs at step 904. This may include, for example, the processing device 104 of the server or other device modifying weights or other parameters of the generator 602 in the machine learning model 600 to more accurately generate realistic versions of the training images, where the more realistic versions of the training images can be compared against their corresponding ground truth images. During this stage, the A hyperparameter described above (if used) may have a relatively high value due the good alignment of the images in the first image pairs.

Second image pairs are generated, received, or otherwise obtained at step 906. This may include, for example, the processing device 104 of the server or other device generating, receiving, or otherwise obtaining image pairs that are more poorly-aligned and/or of lower quality compared to the first image pairs. The second image pairs may include any suitable number of image pairs, and each pair may include a training image and a ground truth image. Machine learning model training continues using the second image pairs at step 908. This may include, for example, the processing device 104 of the server or other device modifying weights or other parameters of the generator 602 in the machine learning model 600 to more accurately generate realistic versions of the training images, where the more realistic versions of the training images can be compared against their corresponding ground truth images. During this stage, the % hyperparameter described above (if used) may have a relatively low value for images in the second image pairs having poor alignment.

The training here results in the creation of a machine learning model that is trained to generate realistic images based on synthetic images at step 910. This may include, for example, the processing device 104 of the server or other device creating a generator 602, where the generator 602 is able to effectively generate images 648 that the discriminator 604 is not able to accurately identify as being artificial. At least a portion of the trained machine learning model is deployed for use at step 912. This may include, for example, the processing device 104 of the server or other device providing the generator 602 of the trained machine learning model 600 to one or more flight vehicles 102 or other platforms for use. Note that the device performing the training here may also be the platform using the trained machine learning model, in which case deploying the trained machine learning model may include placing the trained machine learning model into use by that platform.

Although FIG. 9 illustrates one example of a method 900 for training a machine learning model to support syntheticto-realistic image conversion, various changes may be made to FIG. 9. For example, while shown as a series of steps, various steps in FIG. 9 may overlap, occur in parallel, occur in a different order, or occur any number of times. As a particular example, both the first and second image pairs may be obtained at the same time, such as when the first and second image pairs are included in at least one common dataset.

Figure 10:
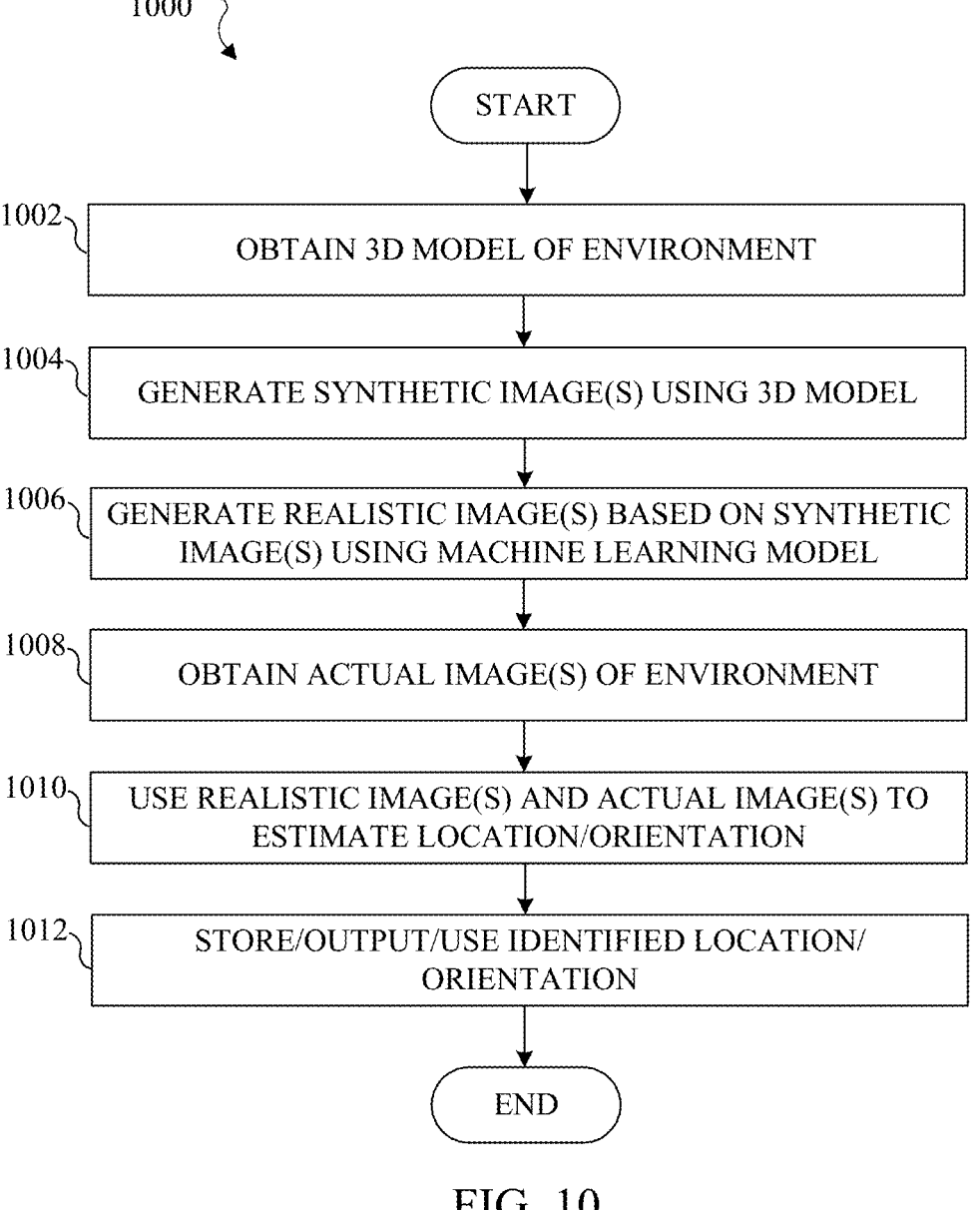
FIG. 10 illustrates an example method for image-based navigation using synthetic-to-realistic image conversion according to this disclosure.

FIG. 10 illustrates an example method 1000 for image-based navigation using synthetic-to-realistic image conversion according to this disclosure. For ease of explanation, the method 10X) is described as being performed using the flight vehicle 102 shown in FIG. 1 with the machine learning model 600 shown in FIGS. 6A and 6B. However, the method 1000 may be performed using any other suitable device(s) or system(s), and the method 1000 may involve the use of any other suitable machine learning model(s).

As shown in FIG. 10, a 3D model of an environment is generated, received, or otherwise obtained at step 1002. This may include, for example, the processing device 104 of the flight vehicle 102 generating, receiving, or otherwise obtaining a 3D point cloud or other 3D model 120. The 3D model 120 may be generated in any suitable manner, such as via processing of images captured of the associated environment. One or more synthetic images are generated using the 3D model at step 1004. This may include, for example, the processing device 104 of the flight vehicle 102 performing the synthetic image generation function 502 to apply the 3D model 120 to one or more images and generate one or more synthetic images 200, 504, 618, 700. As described above, each synthetic image typically includes voids and other artifacts. One or more realistic images are generated using the one or more synthetic images at step 1006. This may include, for example, the processing device 104 of the flight vehicle 102 processing the one or more synthetic images using at least one trained machine learning model 122, 600 or a portion thereof (such as the generator 602, which itself represents a trained machine learning model). This can lead to the generation of one or more realistic images 400, 506, 648, 800.

One or more actual images of the environment are generated, received, or otherwise obtained at step 1008. This may include, for example, the processing device 104 of the flight vehicle 102 generating, receiving, or otherwise obtaining one or more actual images 300, 508 using one or more imaging sensors 118 of the flight vehicle 102. The realistic and actual images are used to estimate the location and/or orientation of the flight vehicle at step 1010. This may include, for example, the processing device 104 of the flight vehicle 102 performing the functions 510-514 to identify and convert tie points in the images and perform photogrammetric analysis. The location and/or orientation of the flight vehicle may stored, output, or used in some manner at step 1012. This may include, for example, the processing device 104 of the flight vehicle 102 determining whether the flight vehicle 102 is at a desired location or following a desired path. The processing device 104 of the flight vehicle 102 may use the location and/or orientation of the flight vehicle 102 in any other suitable manner.

Although FIG. 10 illustrates one example of a method 1000 for image-based navigation using synthetic-to-realistic image conversion, various changes may be made to FIG. 10. For example, while shown as a series of steps, various steps in FIG. 10 may overlap, occur in parallel, occur in a different order, or occur any number of times.

The following describes example embodiments of this disclosure that implement or relate to synthetic-to-realistic image conversion using a generative adversarial network (GAN) or other machine learning model. However, other embodiments may be used in accordance with the teachings of this disclosure.

In a first embodiment, a method includes obtaining training data having first image pairs, where each of the first image pairs includes (i) a first training image and (ii) a first ground truth image. The method also includes training a machine learning model to generate realistic images using the first image pairs. The method further includes obtaining additional training data having second image pairs, where each of the second image pairs includes (i) a second training image and (ii) a second ground truth image. At least some of the images in the second image pairs are less aligned or of lower quality than at least some of the images in the first image pairs. In addition, the method includes continuing to train the machine learning model to generate the realistic images using the second image pairs. In related embodiments, a non-transitory machine-readable medium contains instructions that when executed cause at least one processor to perform the method of the first embodiment.

In a second embodiment, an apparatus includes at least one memory and at least one processing device. The at least one memory is configured to store training data having first image pairs, where each of the first image pairs includes (i) a first training image and (ii) a first ground truth image. The at least one memory is also configured to store additional training data having second image pairs, where each of the second image pairs includes (i) a second training image and (ii) a second ground truth image. At least some of the images in the second image pairs are less aligned or of lower quality than at least some of the images in the first image pairs. The at least one processing device is configured to train a machine learning model to generate realistic images using the first image pairs. The at least one processing device is also configured to continue to train the machine learning model to generate the realistic images using the second image pairs.

Any single one or any suitable combination of the following features may be used with the first or second embodiment or any related embodiment. The machine learning model may include a generative adversarial network, and the generative adversarial network may include a generator and at least one discriminator. Training the machine learning model and continuing to train the machine learning model may include using the first and second image pairs to train the generator, and the generator may be configured to generate the realistic images using the first and second training images. The at least one discriminator may be configured to attempt to differentiate between (i) the first and second ground truth images and (ii) the realistic images generated by the generator. The generative adversarial network may include a conditional generative adversarial network. Training the machine learning model and continuing to train the machine learning model may include using a loss function. The loss function may be based on (i) a generative adversarial network loss and (ii) a feature matching loss. The loss function may include a sample-based adjustable hyperparameter associated with the feature matching loss, and the adjustable hyperparameter may have a larger value when images in image pairs have better alignment and a smaller value when images in image pairs have poorer alignment. The generative adversarial network may include multiple discriminators configured to analyze image data at different scales. At least a portion of the trained machine learning model (such as the generator of the generative adversarial network) may be deployed to one or more platforms for use during inferencing.

In a third embodiment, a method includes obtaining one or more synthetic images of an environment. The method also includes generating one or more realistic images of the environment based on the one or more synthetic images using a trained machine learning model. The method further includes obtaining one or more actual images of the environment. In addition, the method includes determining at least one characteristic of a flight vehicle based on the one or more realistic images of the environment and the one or more actual images of the environment. In related embodiments, an apparatus includes at least one processing device configured to perform the method of the third embodiment. In other related embodiments, a non-transitory machine-readable medium contains instructions that when executed cause at least one processor to perform the method of the third embodiment.

Any single one or any suitable combination of the following features may be used with the third embodiment or any related embodiment. The trained machine learning model may include a generator of a generative adversarial network. The generator of the generative adversarial network may be trained by obtaining training data having first image pairs (each of which may include a first training image and a first ground truth image), training the generator to generate realistic images using the first image pairs, obtaining additional training data having second image pairs (each of which may include a second training image and a second ground truth image), and continuing to train the generator to generate the realistic images using the second image pairs. At least some of the images in the second image pairs may be less aligned or of lower quality than at least some of the images in the first image pairs. Training the generator and continuing to train the generator may include using a loss function. The loss function may be based on (i) a generative adversarial network loss and (ii) a feature matching loss. The loss function may include a sample-based adjustable hyperparameter associated with the feature matching loss, and the adjustable hyperparameter may have a larger value when images in image pairs have better alignment and a smaller value when images in image pairs have poorer alignment. The one or more realistic images of the environment may include image data not contained in the one or more synthetic images. The one or more realistic images of the environment may lack at least some artifacts that are contained in the one or more synthetic images. The one or more synthetic images may be generated based on a 3D model of the environment. The at least one characteristic of the flight vehicle may include at least one of: an estimated location of the flight vehicle, an estimated orientation of the flight vehicle, and an estimated direction of travel of the flight vehicle.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of, A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining training data comprising first image pairs, each of the first image pairs comprising (i) a first training image and (ii) a first ground truth image;
training a machine learning model to generate realistic images using the first image pairs;
obtaining additional training data comprising second image pairs, each of the second image pairs comprising (i) a second training image and (ii) a second ground truth image, wherein at least some of the images in the second image pairs are less aligned or of lower quality than at least some of the images in the first image pairs; and continuing to train the machine learning model to generate the realistic images using the second image pairs;
wherein training the machine learning model and continuing to train the machine learning model comprise using a loss function; and
wherein the loss function is based on (i) a generative adversarial network loss and (ii) a feature matching loss.

2. The method of claim 1, wherein:
the machine learning model comprises a generative adversarial network, the generative adversarial network comprising a generator and at least one discriminator;
training the machine learning model and continuing to train the machine learning model comprise using the first and second image pairs to train the generator, the generator configured to generate the realistic images using the first and second training images; and
the at least one discriminator is configured to attempt to differentiate between (i) the first and second ground truth images and (ii) the realistic images generated by the generator.

3. The method of claim 2, wherein the generative adversarial network comprises a conditional generative adversarial network.

4. The method of claim 1, wherein the loss function comprises a sample-based adjustable hyperparameter associated with the feature matching loss, the adjustable hyperparameter having a larger value when images in image pairs have better alignment and a smaller value when images in image pairs have poorer alignment.

5. The method of claim 2, wherein the generative adversarial network comprises multiple discriminators configured to analyze image data at different scales.

6. The method of claim 1, further comprising:
deploying at least a portion of the trained machine learning model to one or more platforms for use during inferencing.

7. An apparatus comprising:
at least one memory configured to store:
training data comprising first image pairs, each of the first image pairs comprising (i) a first training image and (ii) a first ground truth image; and
additional training data comprising second image pairs, each of the second image pairs comprising (i) a second training image and (ii) a second ground truth image, wherein at least some of the images in the second image pairs are less aligned or of lower quality than at least some of the images in the first image pairs; and
at least one processing device configured to:
train a machine learning model to generate realistic images using the first image pairs; and
continue to train the machine learning model to generate the realistic images using the second image pairs;
wherein, to train the machine learning model and to continue to train the machine learning model, the at least one processing device is configured to use a loss function; and
wherein the loss function is based on (i) a generative adversarial network loss and (ii) a feature matching loss.

8. The apparatus of claim 7, wherein:
the machine learning model comprises a generative adversarial network, the generative adversarial network comprising a generator and at least one discriminator;

to train the machine learning model and to continue to train the machine learning model, the at least one processing device is configured to use the first and second image pairs to train the generator, the generator configured to generate the realistic images using the first and second training images; and the at least one discriminator is configured to attempt to differentiate between (i) the first and second ground truth images and (ii) the realistic images generated by the generator.

9. The apparatus of claim 8, wherein the generative adversarial network comprises a conditional generative adversarial network.

10. The apparatus of claim 7, wherein the loss function comprises a sample-based adjustable hyperparameter associated with the feature matching loss, the adjustable hyperparameter having a larger value when images in image pairs have better alignment and a smaller value when images in image pairs have poorer alignment.

11. The apparatus of claim 8, wherein the generative adversarial network comprises multiple discriminators configured to analyze image data at different scales.

12. The apparatus of claim 8, wherein the at least one processing device is further configured to deploy the generator of the trained machine learning model to one or more platforms for use during inferencing.

13. A method comprising:

obtaining one or more synthetic images of an environment;

generating one or more realistic images of the environment based on the one or more synthetic images using a trained machine learning model;

obtaining one or more actual images of the environment; and determining at least one characteristic of a flight vehicle based on the one or more realistic images of the environment and the one or more actual images of the environment;

wherein the trained machine learning model is trained by:

training a machine learning model to generate realistic images using first image pairs, each of the first image pairs comprising (i) a first training image and (ii) a first ground truth image; and continuing to train the machine learning model to generate the realistic images using second image pairs, each of the second image pairs comprising (i) a second training image and (ii) a second ground truth image, wherein at least some of the images in the second image pairs are less aligned or of lower quality than at least some of the images in the first image pairs;

wherein training the machine learning model and continuing to train the machine learning model comprise using a loss function; and wherein the loss function is based on (i) a generative adversarial network loss and (ii) a feature matching loss.

14. The method of claim 13, wherein the trained machine learning model comprises a generator of a generative adversarial network, the generator of the generative adversarial network trained by:

obtaining training data comprising the first image pairs;

training the generator to generate the realistic images using the first image pairs;

obtaining additional training data comprising the second image pairs; and continuing to train the generator to generate the realistic images using the second image pairs.

15. The method of claim 13, wherein the loss function comprises a sample-based adjustable hyperparameter associated with the feature matching loss, the adjustable hyperparameter having a larger value when images in image pairs have better alignment and a smaller value when images in image pairs have poorer alignment.

16. The method of claim 13, wherein:

the one or more realistic images of the environment include image data not contained in the one or more synthetic images; and the one or more realistic images of the environment lack at least some artifacts that are contained in the one or more synthetic images.

17. The method of claim 13, wherein the one or more synthetic images are generated based on a three-dimensional (3D) model of the environment.

18. The method of claim 13, wherein the at least one characteristic of the flight vehicle comprises at least one of: an estimated location of the flight vehicle, an estimated orientation of the flight vehicle, and an estimated direction of travel of the flight vehicle.

19. The method of claim 1, wherein the machine learning model is trained to convert images between domains without introducing hallucinations.

20. The method of claim 13, wherein the machine learning model is trained to convert images between domains without introducing hallucinations.

\* \* \* \* \*